(12) United States Patent
Geng

(10) Patent No.: US 9,426,647 B2
(45) Date of Patent: Aug. 23, 2016

(54) METHOD AND DEVICE FOR PROTECTING PRIVACY DATA OF MOBILE TERMINAL USER

(71) Applicant: ZTE CORPORATION, Shenzhen (CN)

(72) Inventor: Liang Geng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/431,589

(22) PCT Filed: Jul. 9, 2013

(86) PCT No.: PCT/CN2013/079030
§ 371 (c)(1),
(2) Date: Mar. 26, 2015

(87) PCT Pub. No.: WO2013/182112
PCT Pub. Date: Dec. 12, 2013

(65) Prior Publication Data
US 2015/0281951 A1    Oct. 1, 2015

(30) Foreign Application Priority Data

Sep. 27, 2012    (CN) .......................... 2012 1 0374448

(51) Int. Cl.
*G06F 21/62*    (2013.01)
*H04W 12/02*    (2009.01)
(Continued)

(52) U.S. Cl.
CPC .............. *H04W 12/02* (2013.01); *G06F 21/62* (2013.01); *H04L 9/3226* (2013.01); *H04W 12/06* (2013.01); *H04L 63/083* (2013.01); *H04L 2209/80* (2013.01); *H04W 12/08* (2013.01)

(58) Field of Classification Search
None
See application file for complete search history.

(56) References Cited

U.S. PATENT DOCUMENTS

| 8,825,928 B2 * | 9/2014 | Jeal ......................... G06F 21/12 320/128 |
| 2002/0165008 A1 * | 11/2002 | Sashihara ............. H04W 88/02 455/558 |

(Continued)

FOREIGN PATENT DOCUMENTS

| CN | 101790161 A | 7/2010 |
| CN | 102883323 A | 1/2013 |

(Continued)

OTHER PUBLICATIONS

Newton, "Cerberus for Android: Three ways to protect and tract your phone with one app", https://recombu.com/mobile/article/cerberus-for-android-three-ways-to-protect-and-track-your-phone-with-one-app__M16321.html (Jan. 3, 2012).

*Primary Examiner* — Hadi Armouche
*Assistant Examiner* — Malcolm Cribbs
(74) *Attorney, Agent, or Firm* — Pearl Cohen Zedek Latzer Baratz LLP

(57) ABSTRACT

Disclosed are a method and device for protecting user privacy data of a mobile terminal in the embodiment of the present invention, related to a wireless terminal, wherein the method includes: when a subscriber identity module card is inserted into a mobile terminal, obtaining card information of the subscriber identity module card, and judging whether there are user privacy data in the mobile terminal or not; if the judgment result is yes, matching the card information with card information stored in the mobile terminal, and displaying the user privacy data for the user to use according to the matching result; and if the judgment result is no, performing security processing on the mobile terminal.

6 Claims, 4 Drawing Sheets

---

When a subscriber identity module card is inserted into a mobile terminal, card information of the subscriber identity module card is obtained, and whether the mobile terminal has user privacy data is judged If there are the user privacy data, the card information is matched with card information stored in the mobile terminal, and the user privacy data is displayed according to the matching result; otherwise, the security processing is performed on the mobile terminal

(51) Int. Cl.
 H04W 12/06 (2009.01)
 H04L 9/32 (2006.01)
 H04W 12/08 (2009.01)
 H04L 29/06 (2006.01)

(56) References Cited

U.S. PATENT DOCUMENTS

| | | | | |
|---|---|---|---|---|
| 2004/0209651 | A1* | 10/2004 | Tsukamoto | H04W 12/06 455/558 |
| 2005/0075092 | A1* | 4/2005 | Kim | H04W 12/08 455/411 |
| 2005/0164738 | A1* | 7/2005 | Liu | H04M 1/675 455/558 |
| 2006/0084472 | A1* | 4/2006 | Park | G06Q 20/32 455/558 |
| 2006/0129848 | A1* | 6/2006 | Paksoy | G06F 21/78 713/193 |
| 2006/0168658 | A1* | 7/2006 | Kallio | G06F 12/1458 726/21 |
| 2006/0258333 | A1* | 11/2006 | Yang | G06F 11/1451 455/412.1 |
| 2006/0293029 | A1* | 12/2006 | Jha | H04M 1/72522 455/411 |
| 2007/0073698 | A1* | 3/2007 | Kanayama | G06F 21/62 |
| 2007/0250903 | A1* | 10/2007 | Furuichi | G06F 21/6245 726/1 |
| 2008/0032743 | A1* | 2/2008 | Lee | H04L 63/10 455/558 |
| 2008/0046398 | A1 | 2/2008 | Halme et al. | |
| 2008/0082852 | A1* | 4/2008 | Denpo | G06F 1/263 713/340 |
| 2008/0113651 | A1* | 5/2008 | Choi | H04M 1/66 455/411 |
| 2008/0161050 | A1* | 7/2008 | Shudark | H04W 12/08 455/558 |
| 2009/0061828 | A1* | 3/2009 | Sigmund | H04M 3/02 455/413 |
| 2009/0265759 | A1* | 10/2009 | Ichimi | G06F 21/84 726/2 |
| 2009/0312055 | A1* | 12/2009 | Liu | H04B 1/3805 455/558 |
| 2010/0037047 | A1* | 2/2010 | Varriale | G06F 21/6209 713/165 |
| 2010/0169660 | A1* | 7/2010 | Voss | H04L 63/06 713/183 |
| 2010/0216428 | A1* | 8/2010 | Jain | H04M 1/66 455/410 |
| 2010/0317320 | A1* | 12/2010 | Sakargayan | G06F 21/31 455/410 |
| 2013/0174265 | A1* | 7/2013 | Chan | G06F 12/1408 726/26 |

FOREIGN PATENT DOCUMENTS

| | | |
|---|---|---|
| EP | 1 523 202 | 4/2005 |
| EP | 2 134 061 | 12/2009 |
| WO | WO 2011/157242 | 12/2011 |

* cited by examiner

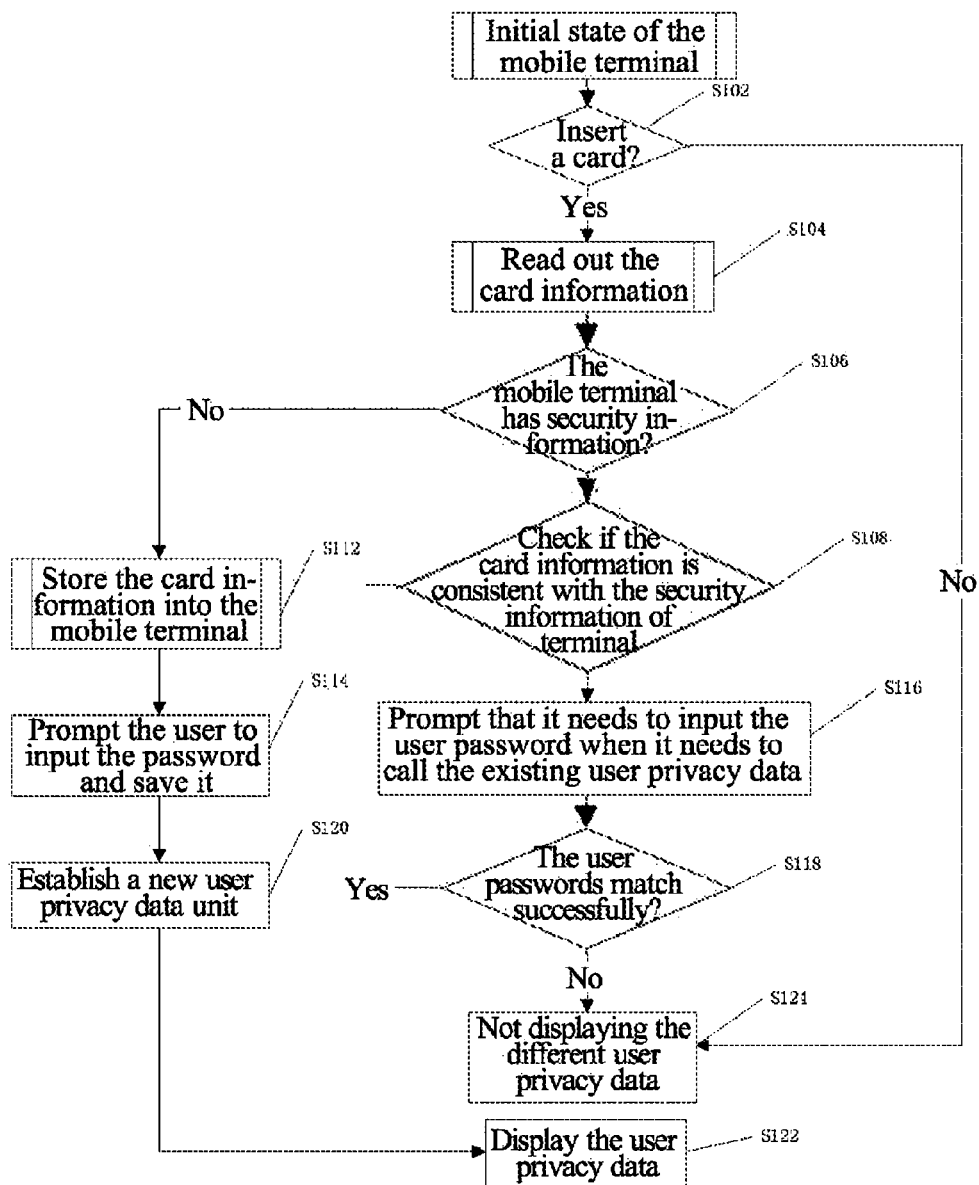

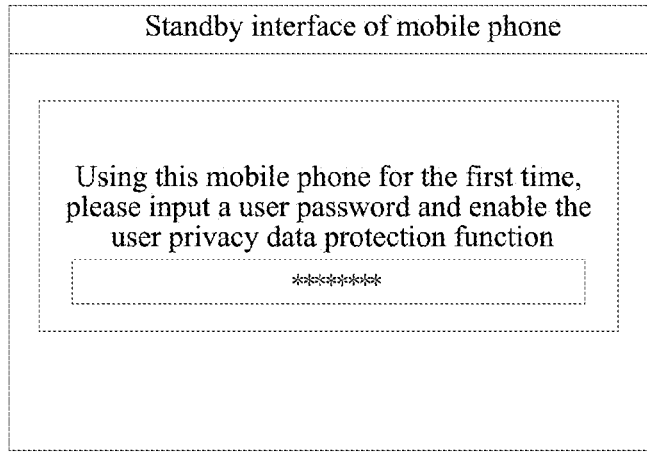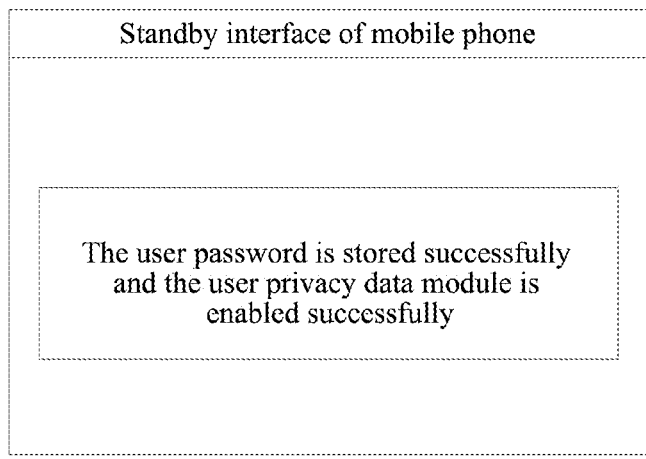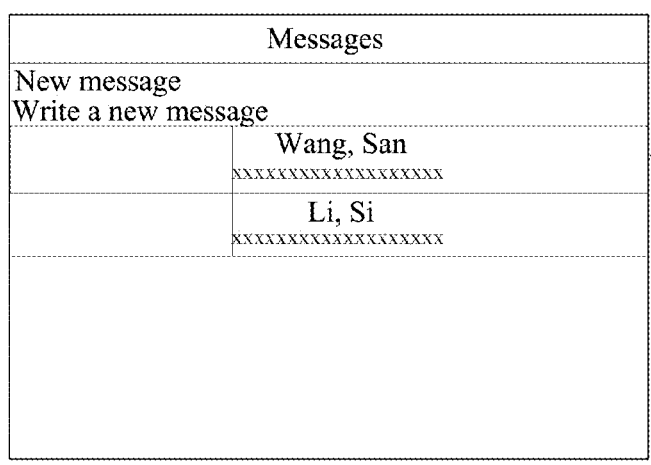
FIG. 3

METHOD AND DEVICE FOR PROTECTING PRIVACY DATA OF MOBILE TERMINAL USER

CROSS-REFERENCE TO RELATED APPLICATIONS

This application is a National Phase Application of PCT International Application No. PCT/CN2013/079030, entitled "METHOD AND DEVICE FOR PROTECTING PRIVACY DATA OF MOBILE TERMINAL USER", International Filing Date Jul. 9, 2013, published on Dec. 12, 2013 as International Publication No. WO 2013/182112, which in turn claims priority from Chinese Patent Application No. 201210374448.0, filed Sep. 27, 2012, all of which are incorporated herein by reference in their entirety.

TECHNICAL FIELD

The present document relates to the field of mobile terminal technology, and more particularly, to the technology for protecting privacy data of a mobile terminal, and this technology is applicable to a variety of wireless terminals.

BACKGROUND OF THE RELATED ART

Mobile terminals are communication tools used by modernists and contain a variety of user privacy data, such as news, notepad information and so on. The requirements for the security of user privacy data are growing. Better technology is needed to protect the user privacy data and facilitate the user to use simultaneously.

In the related art, some executable technologies are required to achieve the privacy data protection function. A theoretical technology therein is to bind the phone number in the subscriber identity module card with the user privacy data to enhance the security of the user privacy data. However, the protocol defines that the phone number in the subscriber identity module card is optional, and technically it cannot guarantee that all of the subscriber identity module cards can implement the encryption of user privacy data.

At the same time, it is relatively easy to obtain the phone number, when obtaining the user's phone number by borrowing someone else's mobile phone, the user's phone number is written into the card through the writing card mode, and the user privacy data can be obtained by inserting it into the terminal and turning it on. The user privacy data cannot be protected very well.

Currently, with the replacement of the operators' tariff and mobile phone, cases that the user replaces different subscriber identity module cards and buys different phones depending on the circumstances happen frequently, which requires a new method for protecting the user privacy data, thereby realizing functions such as confidentiality, anti-previewing, data storage space replacement and protection parameter update of the user privacy data.

SUMMARY OF THE INVENTION

The embodiment of the present invention provides a method and device for protecting user privacy data of a mobile terminal to better address the problem of poor security of user privacy data.

According to an embodiment of the present invention, a method provided for protecting user privacy data of a mobile terminal comprises:

when a subscriber identity module card is inserted into a mobile terminal, obtaining card information of the subscriber identity module card and judging whether the mobile terminal has user privacy data or not;

if a judgment result is yes, matching the card information of the subscriber identity module card with card information stored in the mobile terminal, and displaying the user privacy data for a user to use according to a matching result;

if the judgment result is no, performing security processing on the mobile terminal.

Preferably, when the card information of the card matches with the card information stored in the mobile terminal, the user privacy data is directly displayed.

Preferably, when the card information of the subscriber identity module card does not match with the card information stored in the mobile terminal, password information subsequently input by the user is received, and the password information is matched with password information stored in the mobile terminal, and the user privacy data is displayed when the password information matches with each other.

Preferably, if the password information matches with the password information stored in the mobile terminal, the card information is bound with the user privacy data stored in the mobile terminal.

Preferably, when the mobile terminal does not have the user privacy data, a user privacy data unit is established for storing the user privacy data, binding the user privacy data unit with the card information and the password information.

Preferably, the card information is IMSI information.

According to another embodiment of the present invention, a device provided for protecting user privacy data of a mobile terminal comprises:

a machine card interaction unit, configured to: when a subscriber identity module card is inserted into a mobile terminal, obtain card information of the subscriber identity module card;

a user privacy data unit, configured to: judge whether the mobile terminal has user privacy data or not, when a judgment result is yes, match the card information with card information stored in the mobile terminal, and display the user privacy information for the user to use according to a matching result, and when the judgment result is no, perform security processing on the mobile terminal.

Preferably, the device further comprises:

an authentication unit, configured to: match password information subsequently inputted by a user with password information stored in the mobile terminal, and display the user privacy data when the password information matches.

Preferably, the user privacy data unit is further configured to: when the card information of the subscriber identity module card does not match with the card information stored in the mobile terminal, and the password information input by the user matches with the password information stored in the mobile terminal, bind the card information with the user privacy data stored in the mobile terminal.

Preferably, the user privacy data unit is further configured to: when creating user privacy data for the first time, bind the user privacy data with the card information and the password information.

The embodiment of the present invention provides a new method for protecting the user privacy data, and the difficulty of technology implementation is low, the security is high, and it meets the user's needs for actual usage.

BRIEF DESCRIPTION OF THE DRAWINGS

FIG. 1 is a flow chart of a method for protecting user privacy data of a mobile terminal provided in an embodiment of the present invention;

FIG. 2 is a flow chart of achieving a scenario of increasing or obtaining user privacy data of a mobile terminal provided in an embodiment of the present invention;

FIG. 3 is a schematic diagram of using the user privacy data protection function setting for the first time provided in an embodiment of the present invention;

DETAILED DESCRIPTION

Figure 4:
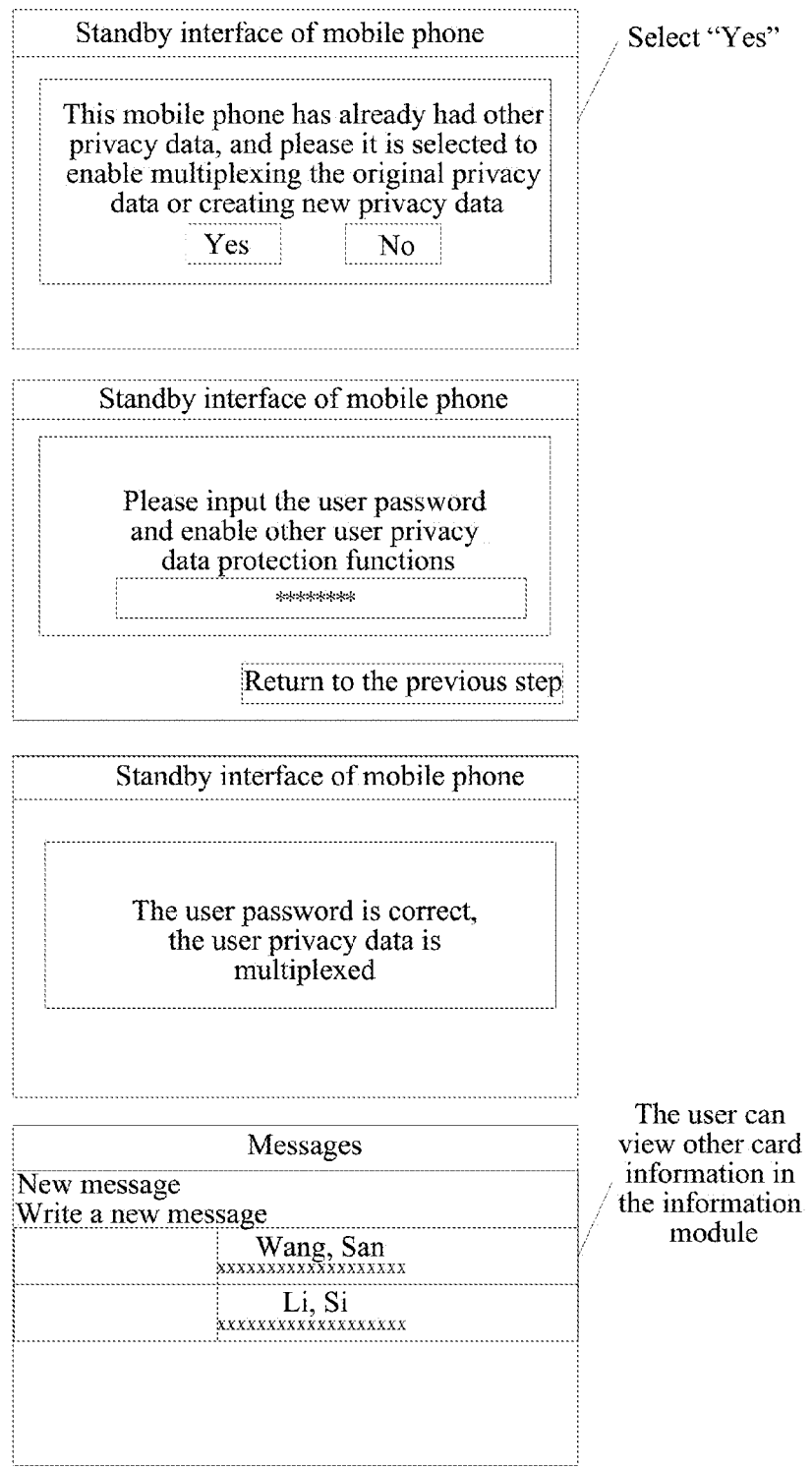
FIG. 4 is a schematic diagram of replacing different cards and calling the original data provided in an embodiment of the present invention.

Hereinafter in conjunction with the accompanying drawings, the preferred embodiments of the present invention will be described in detail. In the case of no conflict, the embodiments of the present application and features in the embodiments may be combined with each other.

FIG. 1 is a flow chart of a method for protecting user privacy data of a mobile terminal provided in an embodiment of the present invention, as shown in FIG. 1, comprising:

in the first step, when a subscriber identity module card is inserted into a mobile terminal, card information of the subscriber identity module card is obtained, and whether the mobile terminal has user privacy data is judged, wherein the subscriber identity module card may be a SIM card of GSM or a UIM card of CDMA or a phone card of any other communication standard.

In the second step, if the judgment result is that there is user privacy data, the card information is matched with card information stored in the mobile terminal, and the user privacy data is displayed for the user to use according to the matching result; if the judgment result is that there is no user privacy data, the security processing is performed on the mobile terminal.

Preferably, when the card information of the subscriber identity module card matches with the card information stored in the mobile terminal, the user privacy data is directly displayed, and when the card information of the subscriber identity module card does not match with the card information stored in the mobile terminal, the password information subsequently input by the user is received, and the password information is matched with the password information stored in the mobile terminal, and when the password information matches with each other, the user privacy data is displayed and the card information is bound with the user privacy data stored in the mobile terminal. When the mobile terminal does not have the user privacy data, a user privacy data unit for storing the user privacy data is established and the user privacy data unit is bound with the card information and the password information. That is, only when the data of the user, terminal and card match with each other in the embodiment of the present invention, the corresponding user privacy data is displayed, thereby enhancing the protection of user privacy data and facilitating the user to use.

Preferably, the abovementioned card information is the IMSI information. According to the specification in the protocol, each card's phone number MSISDN is optional, but the IMSI is a must, and using the IMSI as a judgment basis does not have various technical problems about compatibility, thereby reducing the difficulty of technology implementation and more in line with the actual usage condition.

FIG. 2 is a flow chart of implementing a scenario of an embodiment the present invention provided in an embodiment of the present invention, as shown in FIG. 2, comprising:

in S102: when a terminal is not inserted with a subscriber identity module card, any user privacy data is not displayed.

In S104: when the terminal is inserted with a subscriber identity module card, the terminal reads the parameter information in the subscriber identity module card.

In this step, the parameter information obtained in the card is particularly the IMSI. This value must exists in the card. Generally, this value is provided and written into the card by the operator, it is difficult for the user to obtain this information, therefore the security is relatively high.

In S106: whether the mobile terminal has already had the user privacy data is judged, and if the mobile terminal stores the previous user privacy data, proceeding to step S108, if the mobile terminal does not store the previous user privacy data, proceeding to step S112.

In this step, whether the current mobile terminal has the previous user privacy data is specifically judged, if yes, a window prompt is provided for the user to perform selection and operation. This method can be used to bind different cards with the same user privacy data.

In S108: if the mobile terminal has already had the user privacy data, the mobile terminal checks whether information at the card side is consistent with the data stored in the mobile terminal or not, and if yes, proceeding to step S122, and if no, proceeding to step S112.

In this step, the information at the card side is the IMSI, whether the IMSI in the user privacy data unit stored in the current mobile terminal is consistent with the IMSI obtained from the card side is specifically judged.

In S112: the mobile terminal stores the card information.

In this step, the card information is the IMSI, and it is specifically that the mobile terminal stores the IMSI in the user privacy data storage space, subsequently binding the IMSI with the user's password information and the user privacy data.

In S114: the user is prompted to input the password and save it.

In this step, the password is the user password, and it is specifically that the mobile terminal stores the password information input by the user in the user privacy data storage space and binds it together with the IMSI and the user privacy data.

In S116: on the basis of step S108, the user is required to input the password.

In this step, the password is the user password, the password input by the user needs to be consistent with the user password stored in the user privacy data storage space.

In S118: whether the password input by the user matches with the existing user password is judged, when the user password input by the user matches with the user password stored in the user privacy data, proceeding to S122, otherwise, proceeding to S124.

In S120: a new user privacy data unit is created.

In this step, the user privacy data unit is a unit created in the user privacy data storage space for storing the user privacy data aiming at the specific card and the user password. Specifically, after the IMSI and the user passwords have been set, the terminal creates a new user privacy data unit in the user privacy data storage space, and the user privacy data is subsequently stored in this unit, and the unit is bound with the IMSI and the user password information.

In S122: the user privacy data is displayed.

In this step, when determining that the card information IMSI and the user password are consistent with the IMSI and user password bound with the user privacy data, or when creating new user privacy data, the user privacy data is displayed, and the user can view the privacy data.

In S124: the user privacy data is not displayed.

In this step, when the mobile terminal is not inserted with a card, or the IMSI and user password at the card side do not match with the IMSI and user password stored in the user privacy data unit, the user privacy data is not displayed.

FIG. 3 is a schematic diagram of using the user privacy data protection function setting for the first time provided in an embodiment of the present invention, and as shown in FIG. 3, when the mobile terminal does not have user privacy data and it is inserted with a card, the mobile terminal prompts the user to input a user password and enable the user privacy data protection function after successfully storing the user password, and the user uses the card to store the user privacy data.

FIG. 4 is a schematic diagram of replacing different cards to call the original data provided in an embodiment of the present invention, and as shown in FIG. 4, when the mobile terminal has had the user privacy data and it is inserted with a non-matching card, the mobile terminal prompts the user to select multiplexing the original data or creating new user privacy data. When the user selects multiplexing the original data, the mobile terminal prompts the user to input the password and enables other user privacy data protection functions and multiplexes the user privacy data when the input password is correct, that is, when the user inputs the correct user password, other card information can be viewed.

Figure 5:
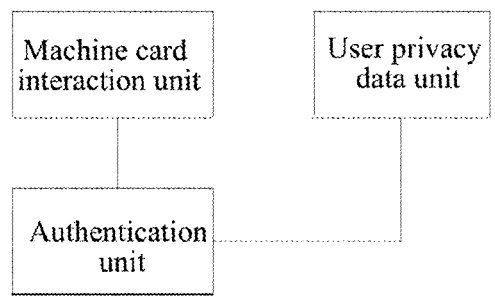
FIG. 5 is a block diagram of a device for protecting user privacy data of a mobile terminal provided in an embodiment of the present invention.

FIG. 5 is a block diagram of a device for protecting user privacy data of a mobile terminal provided in an embodiment of the present invention, and as shown in FIG. 5, the implementation of the embodiment of the present invention is composed of four modules, including a machine card interaction unit, an authentication unit and a user privacy data unit.

The machine card interaction unit is configured to: when a subscriber identity module card is inserted into a mobile terminal, obtain card information of the subscriber identity module card, that is, achieve the data reading between the phone and the card and obtain identification information IMSI of the subscriber identity module card.

The authentication unit is configured to match password information subsequently inputted by the user with the password information stored in the mobile terminal and display the user privacy data when the password information matches, that is, it is used to store and verify the user password, and store the user password matching with the card according to the user's input.

The user privacy data unit is configured to judge whether the mobile terminal has the user privacy data or not, when the judgment result is that there exists the user privacy data, match the card information with card information stored in the mobile terminal, and display the user privacy information for the user to use according to the matching result, otherwise, perform security processing on the mobile terminal. The user privacy data unit is further used to: when creating the user privacy data for the first time, bind the user privacy data with the card information and the password information, and when the card information of the subscriber identity module card does not match with the card information stored in the mobile terminal, and the password information input by the user matches with the password information stored in the mobile terminal, bind the card information with the user privacy data stored in the mobile terminal. Furthermore, the user privacy data unit stores the card information read out from the subscriber identity module card, and stores the user privacy data and associates it with the user password, and according to different cards and user passwords, it calls different user privacy data. For example, a terminal is used by two different persons A and B, both of whom store the user privacy data in the terminal, and when the terminal is inserted with B's card, the terminal compares the card parameters and the password information input by the user with the card parameters and password information stored in the user privacy data unit, and the user privacy data, whose associated card parameters and password information matches, is only displayed.

The workflow of the device is as follows:

when the user inserts a card, the mobile terminal obtains the IMSI of the card and checks whether the mobile terminal has the previous user privacy data and the user privacy data matching with this IMSI or not. If there exists the user privacy data and the user privacy data matches with the card parameters, then the user privacy data is displayed. If there is the user privacy data, but the user privacy data does not match with the card parameters, the user is prompted whether the user privacy data is required to be bound with the card or not, and a user password is input for matching if the binding is required. If the binding is required and the input user password matches, the user privacy data are successfully bound with this card and the user privacy data is displayed, conversely, the user password does not match and the binding is unsuccessful. If the binding is not required, there is no need to input the user password, and the other non-protection functions can be used normally. That is, if the terminal has the previous user privacy data, the user will be prompted whether to call the previous user privacy data or not, and the user password is verified to confirm whether the user is a legitimate user or not, in the case that the user is a legitimate user, the previous user privacy data is displayed, otherwise the user privacy data is not displayed. If the terminal does not have the user privacy data, the user is prompted to set the user privacy data, and the corresponding information is stored after the setting.

Preferably, when the user replaces the mobile terminal, an external storage device of the terminal can be used to transport the user privacy data from one terminal to another. But calling the user privacy data still needs to perform matching and verification on data.

In another embodiment, a software tool is also provided, and the software tool is used to execute the abovementioned embodiment and the technical scheme described in the preferred embodiment.

In another embodiment, a storage medium is also provided, and the storage medium stores the abovementioned software tool, the storage medium includes but not limited to: compact disc, floppy disk, hard disk, erasable memory, or the like.

Obviously, a person skilled in the art should understand that the respective modules or steps of the present document can be implemented with general-purpose computing devices, and they can be concentrated on a single computing device or distributed in a network composed of multiple computing devices, alternatively, they may be implemented through program codes executable by computing devices, so that they can be stored in storage means and executed by computing devices, and in some cases, the illustrated or described steps can be performed in a order different from the order herein, or they can be made into individual integrated circuit modules, or some of the modules or steps can be made into a single integrated circuit module for implementation. Therefore, the patent document is not limited to any specific hardware and software combination.

In summary, the embodiment of the present invention has the following technical effects:

1, the embodiment of the present invention provides a new method for protecting user privacy data, the difficulty of technology implementation is low and the security is high.

2, the phone number is easy to be obtained and misappropriated by others, but the security of IMSI is high, and in the embodiment of the present invention, by using the IMSI information of the card, the user privacy data is made hard to be obtained and misappropriated.

3, in the embodiment of the present invention, the user password authentication is increased, and the confidentiality of the user privacy data is enhanced, and by calling the same user privacy data with different cards, it meets the ability that the user replaces the cards for other reasons but the original data can still be used, which is in line with the user's actual usage demand and facilitates the user to use and increases the terminal functionality.

Although the above specification describes the patent document in detail, the patent document is not limited thereto; those skilled in the art may make various modifications according to the principles of the patent document. Therefore, all modifications made in accordance with the principles of the patent document should be understood to fall within the protection scope of the present document.

INDUSTRIAL APPLICABILITY

The embodiment of the present invention provides a new method for protecting user privacy data, the difficulty of technology implementation is low, the security is high, and it is in line with the user's needs for actual usage.

What is claimed is:

1. A method for protecting user privacy data of a mobile terminal, comprising:
   when a subscriber identity module card is inserted into a mobile terminal, obtaining card information of the subscriber identity module card and judging whether the mobile terminal has user privacy data or not;
   if the mobile terminal has the user privacy data, matching the card information of the subscriber identity module card with card information stored in the mobile terminal;
      when the card information of the subscriber identity module card matches with the card information stored in the mobile terminal, directly displaying the user privacy data for a user to use;
      when the card information of the subscriber identity module card does not match with the card information stored in the mobile terminal, receiving password information subsequently input by the user, and matching the password information input by the user with password information stored in the mobile terminal,
         when the password information input by the user matches with password information stored in the mobile terminal, displaying the user privacy data, and binding the card information of the subscriber identity module card with the user privacy data stored in the mobile terminal;
   if the mobile terminal has no user privacy data, performing security processing on the mobile terminal.

2. The method of claim 1, wherein if the judgment result is that there do not exist the user privacy data, the step of performing security processing on the mobile terminal comprises: when the mobile terminal does not have the user privacy data, establishing a user privacy data unit for storing the user privacy data, and binding the user privacy data unit with the card information and the password information.

3. The method of claim 1, wherein the card information is international mobile subscriber identity (IMSI) information.

4. A device for protecting user privacy data of a mobile terminal, comprising:
   a computing device executing program code stored in a non-transitory computer readable medium which when executed causes the following units execute as follows:
   a machine card interaction unit, configured to: when a subscriber identity module card is inserted into a mobile terminal, obtain card information of the subscriber identity module card; and
   a user privacy data unit, configured to: judge whether the mobile terminal has user privacy data or not, when the mobile terminal has the user privacy data, match the card information of the subscriber identity module card with card information stored in the mobile terminal, and display the user privacy information for a user to use when the card information of the subscriber identity module card matches with the card information stored in the mobile terminal, and when the mobile terminal has no user privacy data, perform security processing on the mobile terminal;
   an authentication unit, configured to: when the card information of the subscriber identity module card does not match with the card information stored in the mobile terminal, match password information subsequently inputted by a user with password information stored in the mobile terminal, and display the user privacy data when the password information matches;
   wherein the user privacy data unit is further configured to: when the card information of the subscriber identity module card does not match with the card information stored in the mobile terminal, while in the authentication unit the password information input by the user matches with the password information stored in the mobile terminal, bind the card information of the subscriber identity module card with the user privacy data stored in the mobile terminal.

5. The device of claim 4, wherein the user privacy data unit is further configured to: when creating user privacy data for the first time, bind the user privacy data with the card information and password information.

6. The method of claim 2, wherein the card information is international mobile subscriber identity (IMSI) information.

* * * * *